United States Patent [19]

Szabo

[11] Patent Number: 5,592,469
[45] Date of Patent: Jan. 7, 1997

[54] RADIO SYSTEM

[75] Inventor: Laszlo Szabo, Korntal, Germany

[73] Assignee: Alcatel SEL A.G., Stuttgart, Germany

[21] Appl. No.: 287,848

[22] Filed: Aug. 9, 1994

[30] Foreign Application Priority Data

Aug. 28, 1993 [DE] Germany .................. 43 29 010.8

[51] Int. Cl.⁶ .................. H04J 4/00; H04J 13/00
[52] U.S. Cl. .................. 370/342; 370/344; 370/468
[58] Field of Search .................. 370/17, 18, 50, 370/69.1, 79, 95.1, 95.3, 84; 379/63; 455/33.1, 34.1; 375/205

[56] References Cited

U.S. PATENT DOCUMENTS

| | | | |
|---|---|---|---|
| 4,688,210 | 8/1987 | Eizenhöfer et al. | 370/18 |
| 4,754,453 | 6/1988 | Eizenhöfer | 370/18 X |
| 4,799,252 | 1/1989 | Eizenhöfer et al. | 370/50 X |
| 5,345,439 | 9/1994 | Marston | 370/50 X |
| 5,349,580 | 9/1994 | Hester et al. | 370/95.1 X |
| 5,471,645 | 11/1995 | Felix | 370/84 X |

FOREIGN PATENT DOCUMENTS

| | | |
|---|---|---|
| 0209185 | 1/1987 | European Pat. Off. . |
| 0462952 | 12/1991 | European Pat. Off. . |
| 0513841 | 11/1992 | European Pat. Off. . |
| 0532485 | 3/1993 | European Pat. Off. . |
| 3138523 | 4/1983 | Germany . |
| 3235804 | 3/1984 | Germany . |
| 3423289 | 1/1986 | Germany . |
| 4215096 | 11/1992 | Germany . |
| 4219361 | 12/1992 | Germany . |

OTHER PUBLICATIONS

J. Kedaj et al, "Mobilfunk Handbuch", New Media Company, Ulm, 3rd Ed., 1993, Chapter 4, pp. 11–18.

*Primary Examiner*—Melvin Marcelo
*Attorney, Agent, or Firm*—Ware, Fressola, Van Der Sluys & Adolphson

[57] ABSTRACT

A radio system, particularly a mobile radio system (MRS) is proposed, which has radio interfaces (COMa) with variable parameters (Ta, Fa), which are predetermined and changed by the base station BS. The parameters are computed in the base station on the basis of a requested transmission capacity (CAPr) desired by a remote radio station (MSa), and on the basis of the determination of free transmission capacities (CAPl) within a specified frequency range. The parameters (Ta, Fa) for adjusting the transceivers in the base station and in the remote radio stations are predetermined in such a way, that the desired transmission capacity occupies the fewest possible of the free transmission capacities. An efficient utilization of the frequency spectrum is achieved, where the radio transmission continuously adapts to the capacity requirements of the mobile stations.

27 Claims, 3 Drawing Sheets

RADIO SYSTEM

TECHNICAL FIELD

The invention concerns a radio system including a base station and remote stations, as well as a radio interface and method for transmitting in this radio system.

BACKGROUND OF THE INVENTION

Such a radio system is known from the manual "Mobilfunk" (mobile radio) by J. Kedaj and G. Hentschel, New Media Company, Ulm, 3rd. Edition, 1993, Chapter 4. It describes a radio telephone system that is standardized according to GSM (Global System for Mobile Communications), containing base stations (FuFSt) and remote stations (radio telephone, FuTelG), which exchange useful data and signals via a radio interface. As described in chapters 4.1.5.3 and 4.1.5.8, the radio interface is characterized by parameters predetermined by the radio system in accordance with the GSM standard. Accordingly, two traffic channels (Bm and Lm) with preset utilization rates of 22.8 kbit/s (full-rate) or 11.4 kbit/s (half-rate) are available for transmitting useful data. One of these traffic channels is used depending on the capacity need of the radio service arranged for the remote station. In a conventional radio system, the arrangement and carrying out of radio transmissions, particularly transmissions for services with a capacity need that changes with time, such as perhaps multi-media services, must be adjusted for the specified utilization rates.

DISCLOSURE OF INVENTION

It is the task of the invention to create a radio system and a base station, a remote station and a method of radio transmission that can stand up to this problem.

According to a first aspect of the present invention, a radio system with at least one base station and remote radio stations containing transmitting and receiving means for the transmission of useful data via radio interfaces, whose respective transmission capacity is changed by changes the base station on the basis of requests signaled by the remote radio stations, and based on a monitoring of existing radio transmissions in the field range of the base station, is characterized in that the base station predetermines variable parameters of the radio interfaces for changing the respective transmission capacity, which specify the modulation and the demodulation for the transmitting means or for the receiving means, respectively.

According to a second aspect of the present invention, a base station containing transmitting means and receiving means for the transmission of useful data between it and remote radio stations via radio interfaces, whose respective transmission capacity are changed by the base station on the basis of requests emitted by the remote radio stations, and on the basis of the monitoring of existing radio transmissions in the field range of the base station, is characterized in that the base station predetermines variable parameters of the radio interfaces for changing the respective transmission capacity, which indicate the modulation or the demodulation of the transmitting means, or of the receiving means.

In further accord with the second aspect of the present invention, the base station is further characterized in that the base station predetermines and changes the variable parameters on the basis of a request for a desired transmission capacity made by one of the remote radio stations, in that the base station contains a monitor circuit connected to its receiving means, whereby it monitors existing radio transmissions inside a specified frequency range and determines free transmission capacities, and in that the base station contains an evaluation circuit connected to its transmitting and receiving means, whereby it determines the variable parameters of the radio interface, adjusts its transmitting and receiving means according to these parameters, and signals these parameters to the remote radio station for their adjustment, so that the least and fewest possible free transmission capacities are occupied for the assignment of the desired transmission capacity.

According to a third aspect of the present invention, a remote radio station containing transmitting means and receiving means for the transmission of useful data between it and a base station according to at least one multiple access method via a radio interface, whose transmission capacity is changed by the base station on the basis of the monitoring of existing radio transmissions in the field range of the base station, is characterized in that the transmitting means and the receiving means are adjustable according to variable parameters predetermined by the base station, and which indicate an FDMA-position and/or a CDMA-code for a radio channel with a channel capacity that corresponds to the radio transmission, and that the remote radio station contains an input/output device, whereby a subscriber requests and utilizes the transmission of at least one service, and that the remote radio station contains a control circuit that is connected to the input/output devices, the transmitting means and the receiving means, with which it determines a desired capacity for the radio transmission and signals the request for this desired transmission capacity to the base station.

In further accord with the third aspect of the present invention, the remote radio station is further characterized in that the control circuit determines the desired transmission capacity on the basis of a minimum quality requested by the service subscriber, and/or on the basis of a minimum transmission quality, which requires error-free signal processing in the input/output devices, and that the control circuit adjusts the transmitting and receiving means according to the changed parameters predetermined by the base station.

In still further accord with the third aspect of the present invention, the remote radio station contains transmitting means and receiving means for the transmission of useful data between it and a base station according to at least one multiple access method via a radio interface, whose transmission capacity is changed by the base station on the basis of the monitoring of existing radio transmissions in the field range of the base station, is still further characterized in that the transmitting means and the receiving means are adjustable according to variable parameters predetermined by the base station, and which indicate an FDMA-position and/or a CDMA-code for a radio channel with a channel capacity that corresponds to the radio transmission, and that the remote radio station contains an input/output device, whereby a subscriber requests and utilizes the transmission of at least one service, and that the remote radio station contains a control circuit that is connected to the input/ output devices, the transmitting means and the receiving means, with which it determines a desired capacity for the radio transmission and signals the request for this desired transmission capacity to the base station.

According to a fourth aspect of the present invention, a radio interface for transmission in a radio system between a base station and a remote radio station is characterized in that the radio interface has variable parameters which specify the modulation and demodulation of the transmission, thereby determining the capacity of the radio transmission.

In further accord with the fourth aspect of the present invention, the radio interface is a frequency-division multiple access or code-division multiple access radio interface, wherein the radio interface has variable parameters which indicate an FDMA frequency position and/or a CDMA code, thereby determining the capacity of the radio transmission, i.e., channel capacity.

According to a fifth aspect of the present invention, a method for transmission in a radio system between a base station and a remote radio station is characterized in that the transmission takes place via a radio interface with variable parameters which indicate the modulation and demodulation for the transmission and for varying their transmission capacity, and which are predetermined and changed by the base station on the basis of requests signaled by the remote radio station and on the basis of the monitoring of a specified frequency range, which are performed by the base station, and are determined by the existing radio transmission in the field range of the base station.

According further to this fifth aspect of the present invention. The method for transmission is according to at least one multiple access method in a radio system between a base station and a remote station of several remote radio stations, wherein the transmission takes place through a radio interface with variable parameters which are indicated by an FDMA-frequency position and/or a CDMA-code for varying the transmission capacity, i.e., channel capacity, of the transmission, and which are predetermined and changed by the base station on the basis of requests signaled by the remote radio station, and on the basis of the monitoring of a specified frequency range, which are performed by the base station and determined by the existing radio transmission in the field range of the base station.

According still further to this fifth aspect of the present invention, a desired transmission capacity is requested by the remote radio station, and wherein the base station determines free transmission capacities by monitoring the specified frequency range and predetermines and changes the variable parameters for the assignment of the desired transmission capacity, so that the least and fewest possible free transmission capacities are occupied.

In still further accord with the fifth aspect of the present invention, it is agreed between the base station and the remote station not to transmit, or to transmit with minimum quality, if the desired transmission capacity is greater than the free transmission capacities, where the base station predetermines the variable parameters to guarantee this minimum quality.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
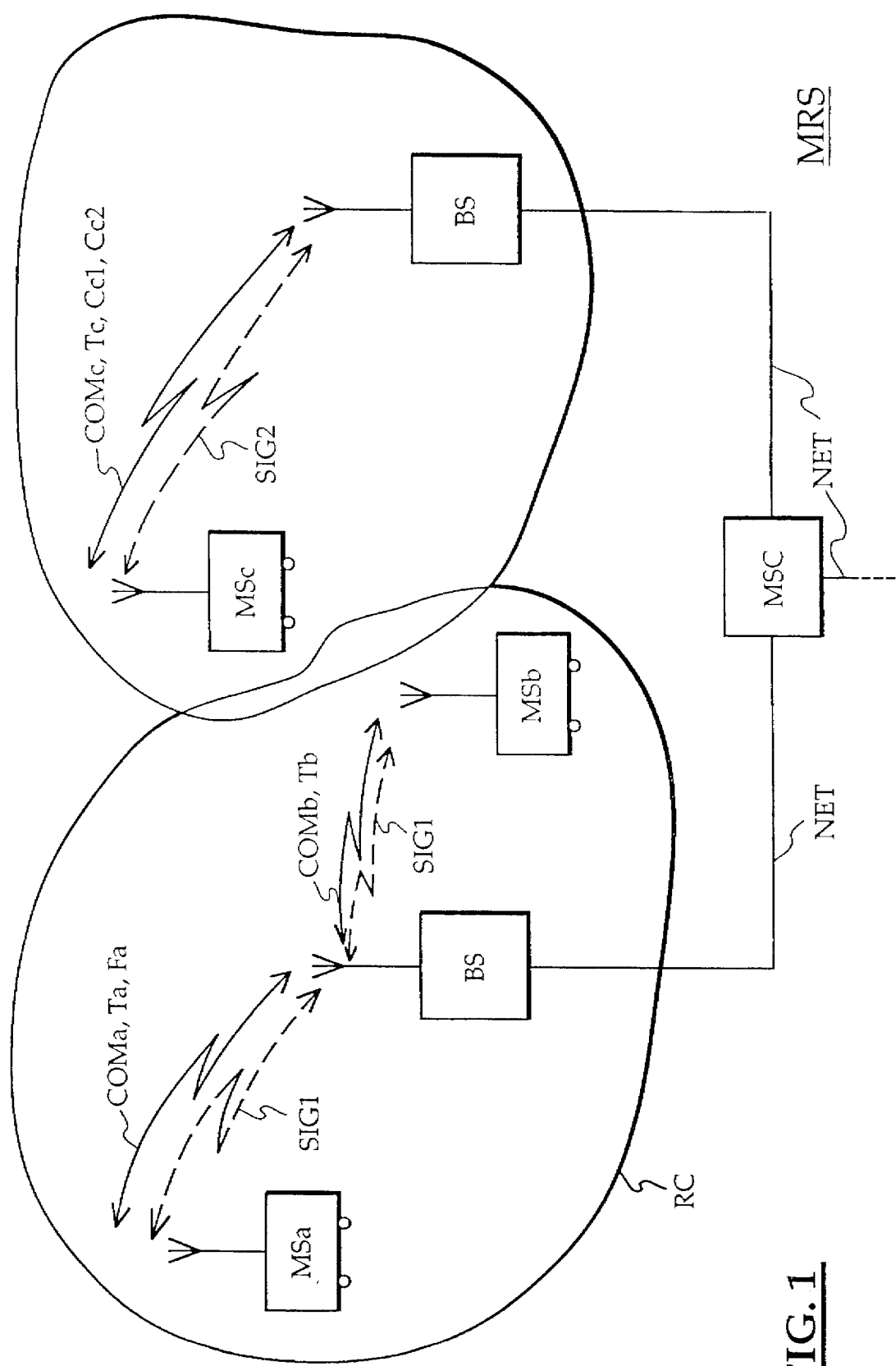
FIG. 1 depicts a mobile radio system according to the invention.

FIG. 1 represents a radio system as a mobile radio system MRS with two base stations BS, a radio interface station MSC and three remote stations MSa, MSb and MSc. The remote stations are mobile stations, but can also be stationary radio stations. A network NET connects the base stations with the radio interface MSC, which switches message links to telecommunication networks. Two of the mobile stations MSa and MSb are located in the field range RC of one of the base stations BS. The other mobile station MSc is located in the field range of the other base station.

Transmissions between the mobile stations and the base stations take place through radio interfaces SIG1 and SIG2, which are characterized by fixed parameters, and via radio interfaces COMa to COMc, which are characterized by variable parameters Ta, Fa, Tb, Tc, Cc1 and Cc2. The radio interfaces with fixed parameters SIG1 and SIG2 will hereafter be called fixed radio interfaces. They are used for signaling between the base stations and the mobile stations. The radio interfaces with variable parameters COMa to COMc will hereafter be called flexible radio interfaces. They serve to transmit useful data between the radio stations. The transmission of signals and useful data takes place within a frequency range between 1895 and 1935 MHz for example, where the signaling takes place in the lower portion of this frequency range within a narrow band of 25 kHz, for example. The other much larger portion of the frequency range is reserved for the transmission of useful data. The base stations predetermine the variable parameters of the radio interfaces COMa to COMc for the transmission of useful data in such as way, that the transmission capacities are adapted to the individual requirements of the remote radio stations (mobile stations). Furthermore, the base stations change the parameters of the radio interfaces COMa to COMc, if this is required by changing demands from the mobile stations. For that reason, interfaces COMa to COMc are referred to as flexible radio interfaces in the following. The predetermination and change of the variable parameters for the flexible radio interfaces for assignment to the respective remote station will be described in more detail later on.

FIG. 1 illustrates a possible assignment of flexible radio interfaces as follows: One of the mobile stations MSa exchanges useful data with one of the base stations BS via a flexible radio interface COMa, whose parameters TA characterize a time channel inside a radio transmission in the time-division multiple-access (TDMA), and whose parameters Fa characterize a frequency channel inside a radio transmission in the frequency-division multiple-access (FDMA). After analysis, these parameters were assigned in such a way by the base station within the frequency range, that free transmission capacities, i.e. free time or frequency channels in this instance, were readied for the arrangement of the flexible radio interface. For example, the time channel Ta lies in a frequency band between 1900 and 1925 MHz, which is reserved for a TDMA radio transmission with eight time slots S1 to S8 and a frequency raster of 200 kHz. The TDMA transmission described in this instance is more precisely illustrated in FIG. 2a and essentially corresponds to the recommendations for the "DCS 1800" system (Digital Cellular System, 1800 MHz). In this instance, the time channel Ta is located on the 1900.3 MHz carrier frequency in time slot S8, where the latter is alternately shared by another time slot (half-rate channel). The time slot Ta has a frequency bandwidth of 12.5 kHz and is assigned to the mobile station MSa for FAX transmission at 8 kbit/s.

In addition to the FAX transmission, the mobile station MSa has booked a VIDEO service (videophone transmission) requiring a utilization rate of 1536 kbit/s. To that end, a frequency channel within a frequency band between 1925 and 1930 MHz has been arranged by the base station BS. This frequency range is reserved for an FDMA transmission and has no fixed frequency raster. The frequency channel assigned to the video transmission has a bandwidth of 1800 kHz. The signaling between the mobile station MSa and the base station takes place through a fixed radio interface SIG1 (signaling channel).

The other mobile stations MSb and MSc also have flexible radio interfaces COMb and COMc assigned to them, where mobile station MSb is connected to one of the base stations and mobile station MSc to the other base station. Mobile station MSb exchanges signals with base station BS through the fixed radio interface SIG1. The following describes in greater detail, by means of FIG. 2, how the flexible radio interfaces COMa to COMc are adapted for the capacity requirements of the mobile stations, for exchange of useful data.

Figure 2A:
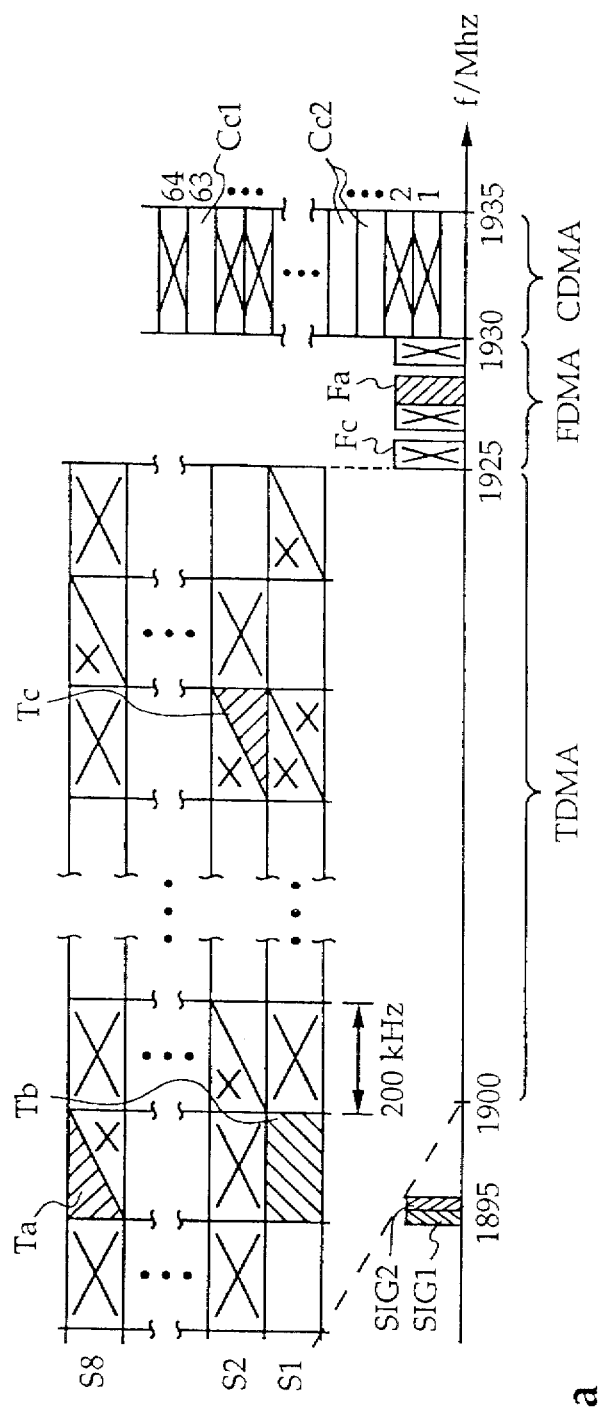
FIG. 2a depicts a frequency spectrum assigned to the mobile radio system, in which different multiple access methods are used for radio transmission.

FIG. 2a depicts a possible partition of a frequency range for radio transmission between 1895 and 1935 MHz. Two frequency channels with a bandwidth of 12.5 kHz each are arranged in the lower frequency range between 1895 and 1895.05 MHz for signaling. The frequency range between 1900 and 1935 MHz is used for the radio transmission of useful data and is divided into three partial ranges. Each partial range is reserved for a predetermined transmission method. The partial range between 1900 and 1925 MHz is reserved for TDMA transmission with a frequency raster of 200 kHz and a time slot sequence of eight time slots S1 to S8, as recommended for the DCS 1800 radio system. Thus, a bandwidth of 25 kHz (full-rate) is available when a time slot is continuously occupied. The partial range between 1925 and 1930 MHz is reserved for an FDMA transmission method in which no fixed frequency raster is used. The remaining partial range between 1930 and 1935 MHz is reserved for code-division multiple-access (CDMA) transmission with a code alphabet of 6-bit word width. Every code channel has therefore a bandwidth of 78.125 kHz.

In this configuration example, the base stations BS have limitless access only in the FDMA and CDMA frequency range. In the TDMA frequency range, each base station only has access to one carrier frequency. The transmitting and receiving means of the base station can be adjusted for the different transmission methods. The transmission methods could be determined by different norms, so that the base stations could be characterized as multi-norm base stations. For example, TDMA transmission takes place according to the DCS 1800 recommendation, which is presently being elaborated by ETSI (European Telecommunications Standards Institute) in accordance with the GSM norm. To simplify the illustration of this configuration example, the mobile stations can only access one or two of the depicted frequency ranges, i.e. they are single- or dual-norm terminals. Depending on the configuration of the individual mobile station, the variable parameters are adapted by the base station to the capacity requirement of the mobile stations within the framework of the possible radio transmission methods (norms).

The invention can also envision a mobile radio system, in which each of the mobile stations, as well as each of the base stations, can have unlimited access to the depicted frequency range. The time, frequency and code channels are then occupied in such a way, that each mobile station can utilize all the requested services, and the transmissions do not interfere with each other. To that effect, the base stations evaluate requests signaled by the mobile stations, determine free transmission capacities, i.e. free channels for radio transmission, and predetermine the parameters for the flexible radio interfaces. A fixed resource plan that assigns predetermined frequency, time or code ranges to each base station, is not required. For example, the actual channel utilization is exchanged between the base stations by the network. On the one hand, this mobile radio system is flexible with regard to the respective transmission between a mobile station and the base station, in that the arranged flexible radio interface is adapted to the requested transmission capacity. On the other hand, this mobile radio system is also flexible with regard to the traffic incidence, in that each base station only uses as much transmission capacity as required by the radio situation in its field range.

The partition of the frequency range into three partial ranges, depicted in FIG. 2a, simplifies the illustration insofar as only time, or frequency, or code channels are addressed in this case. However, the TDMA, FDMA and CDMA transmission methods depicted in the three partial ranges can also be combined with each other.

Figure 2B:
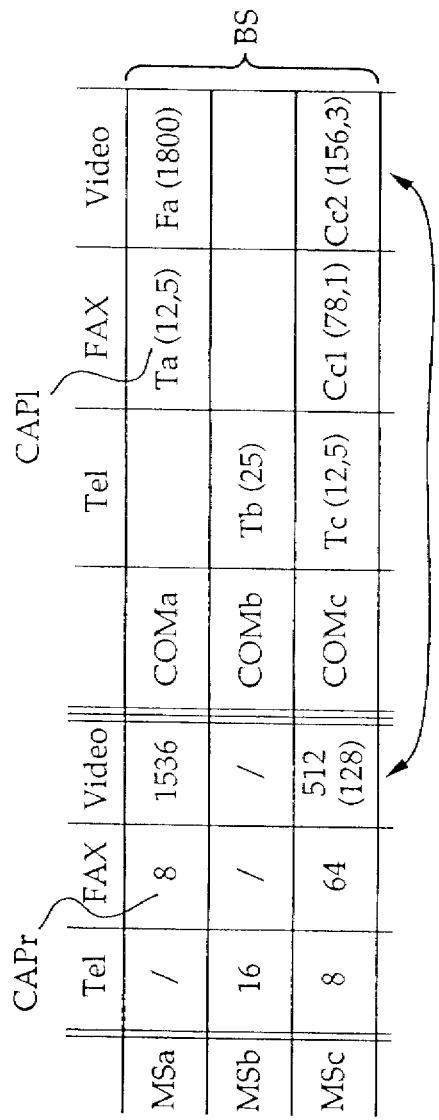
FIG. 2b depicts service profiles with the corresponding radio interface parameters arranged for different subscribers.

The illustration in FIG. 2b shows a possible radio transmission situation (channel occupation) wherein occupied transmission capacities (channels) are indicated by a cross. The remaining free transmission capacities (channels) are determined by spectrum analysis in the base stations, and are available for assignment. A simple spectrum analysis, in which energy density spectra are evaluated, is sufficient to determine whether a frequency channel is occupied or free. A more elaborate analysis is needed to determine free time or code channels. However, it is sufficient to evaluate energy density spectra to determine approximately how many time or code channels are free. A possible assignment of the channels on the basis of requests from the mobile stations is described in more detail in the following by means of FIG. 2b.

FIG. 2b is a table in which a possible service profile and an assigned adjustment of the flexible radio interfaces COMa to COMc are depicted for each mobile station MSa to MSc. Each service profile comprises up to three services, such as telephone TEL, facsimile transmission FAX and video telephone VIDEO. Each of the mobile stations requests one or more of these services from the base station, by sending a signal of the desired transmission capacity CAPr for the respective service to the base station.

In this example, the mobile station MSa requests FAX service at 8 kbit/s and VIDEO service at 1536 kbit/s (rapid videophone transmission). After these services have been requested, the base station determines free transmission capacities CAPr by analyzing the above described frequency range, and assigns parameters Ta and Fa for adjustment of a flexible radio interface COMa. In this instance, parameter Ta determines a time channel in the TDMA frequency bandwidth range of 12.5 kHz (half-rate channel). This time channel Ta is assigned to mobile station MSa for transmission of the FAX service via flexible radio interface COMa. Parameter Fa characterizes a frequency channel in the FDMA frequency bandwidth range of 1800 kHz. This frequency channel is used for video telephone transmission. Mobile station MSb has only requested the TEL service and claims a desired CAPr transmission capacity of 16 kbit/s. Base station BS predetermines the respective parameter Tb, which defines a time channel with a bandwidth of 25 kHz and characterizes the flexible radio interface COMb. The time channel comprises a free time slot within the TDMA transmission (full-rate channel). The mobile station MSc has requested all three radio services depicted here, and claims a desired transmission capacity of 8 kbit/s for the TEL service, a desired transmission capacity of 64 kbit/s for the FAX service, and a desired transmission capacity of 512 kbit/s (e.g. for slow videophone transmission) for the VIDEO service. The other base station makes flexible radio interface COMc available for these services. Among others, COMc is characterized by parameter Tc, which defines a free time channel with a bandwidth of 25 kHz in the FDMA frequency range. This time channel is made available for telephone transmission TEL. COMc is further characterized by two parameters, one of which corresponds to a first code channel Cc1 and the other to a second code channel Cc2. The first code channel Cc1, which comprises a free code, has a bandwidth of 78.1 kHz and is made available for the FAX transmission. Code channel Cc2 has a bandwidth of 156.3 kHz, which is composed of two free code channels within the CDMA transmission. However, the free transmission capacity of 156.3 kHz is smaller than the transmission capacity of 512 kbit/s desired by the mobile station MSc. The base station BS then signals an inquiry to the mobile station MSc, according to which the mobile station can agree to be assigned a smaller bandwidth channel with 128 kbit/s (e.g. for a slow black-and-white picture sequence).

As clearly shown by FIG. 2, the flexible radio interfaces COMa, COMb and COMc are adapted to the respective requirements of mobile stations MSa, MSb and MSc. In this way the mobile radio system achieves a high utilization of the given frequency spectrum. If the required channel capacity changes during the performance of one of the radio services, such as is the case e.g. during pauses in telephone speech, the mobile station signals the new requirements to the base station, which in turn adapts the channel capacity to the requirements of the moment. The channel capacity of a radio connection therefore changes continuously ("breathing radio channel"), while the variable parameters of the radio interface are adapted to the requirements of the mobile stations.

In addition, modulating and coding methods are agreed for radio transmission between mobile station and base station (e.g. for source or channel coding), which adapt to the respective conditions and to a minimum quality for the radio service. The parameters of the flexible radio interface, which are characterized by modulating and coding, change accordingly. The channel capacity required to maintain the minimum quality is determined by intelligent signal processing methods, such as perhaps adaptive transcoding or image coding according to the MPEG (Motion Picture Expert Group) or the JPEG (Joint Photographic Expert Group), and others.

A particularly simple configuration of the mobile radio system is provided by the depicted example, in that the frequency band is partitioned into fixed partial ranges with fixed transmission methods assigned to the radio transmission. Accordingly the depicted mobile radio system could also be called a multi-norm radio system, where each norm establishes one of the respective transmission methods. To adapt the radio transmission to the requirements of the mobile station, the parameters of the flexible radio interfaces are changed within the framework of the norms, i.e. the base station accesses a defined supply of possible parameters. The radio transmission changes continuously within a norm (e.g. by shifting between half-rate and full-rate mode) and between the different norms (e.g. between GSM and DCS 1800). But other radio systems can be envisioned as well, in which no different norms have been established.

Figure 3:
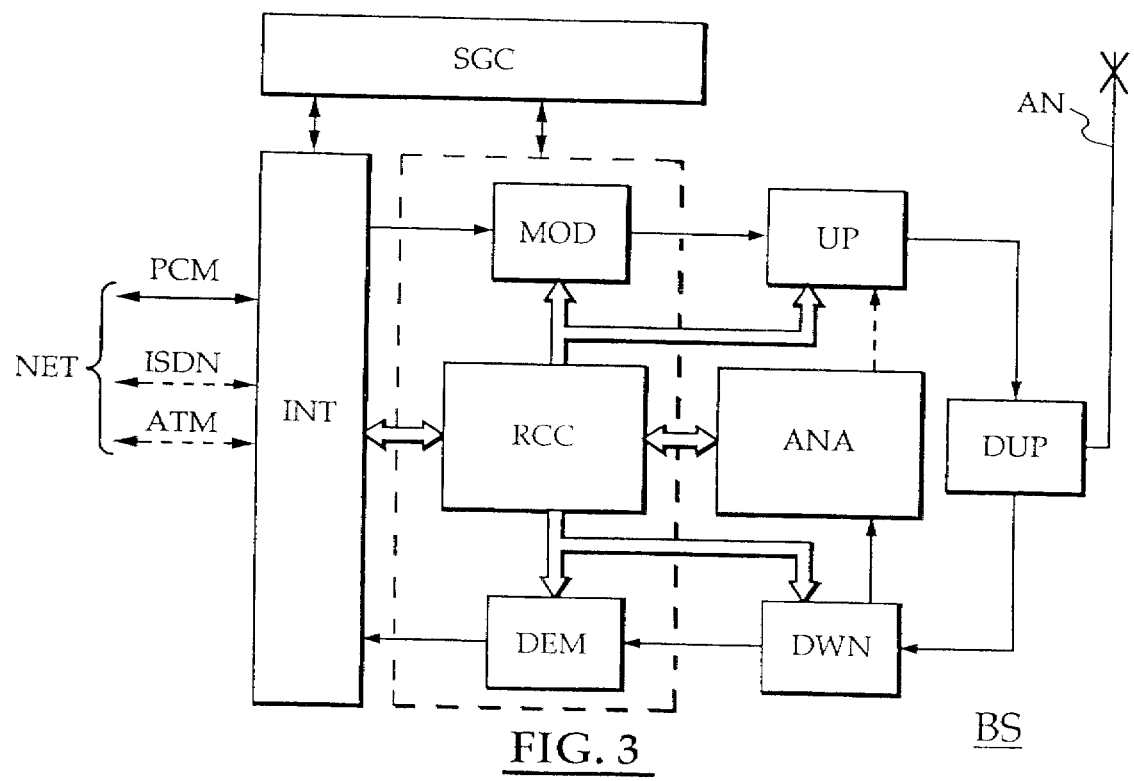
FIG. 3 depicts a base station for the mobile radio system.

The following depicts the circuit arrangement of a base station BS and a remote radio station (mobile station MSa) according to the invention. The base station BS in FIG. 3 is constructed as follows: An antenna AN is connected to a duplexer DUP. The latter is followed by receiving means containing a downward mixing stage DWN and a demodulation stage DEM. The duplexer is preceded by transmitting means in the direction of the transmission, which contain a modulation stage MOD and an upward mixing stage UP. The modulation stage and the demodulation stage are connected to an adapter circuit INT, which provides the connection to the network NET. The network serves to connect the base station BS to a radio interface, where transmission by the PCM method (Pulse Code Modulation) takes place via 30 channels. For example, the network could also be an ISDN or ATM network (ISDN: Integrated Services Digital Network, ATM: Asynchronous Transfer Mode). The receiving and transmitting means, as well as the adapter circuit INT, are controlled by an evaluation circuit RCC, which in turn is connected to a monitor circuit ANA. The monitor circuit follows the downward mixing stage DWN. The base station BS furthermore contains a processor circuit SGC, which controls the modulation stage, the demodulation stage, the evaluation circuit and the adapter circuit. The depicted transmitting and receiving means are adjustable and are provided to transmit useful data. The means for transmitting or receiving signals through the signaling channels are not depicted here.

If the base station BS receives a request for one or more radio services through the signaling channel of a mobile station, and a request for the transmission capacity needed to perform these radio services, the base station scans the specified frequency range by means of the monitor circuit ANA and determines free transmission capacities, i.e. free time, frequency or code channels. The parameters characterizing these free channels are determined by the monitor circuit ANA and are transmitted to the evaluation circuit RCC. The latter in turn compares the free channels, i.e. the free transmission capacities, with the desired transmission capacity and determines parameters that are variable with respect to time, frequency or coding, which define a flexible radio interface, whose transmission capacity occupies the fewest possible of the free transmission capacities. With these variable parameters, the evaluation circuit RCC controls the modulation stage MOD and the upwards mixer UP, as well as the demodulation stage DEM and the downwards mixer DWN, whereby the transmitting or receiving means are adjusted for radio transmission. The evaluation circuit RCC further controls the adapter circuit INT, for adapting the data transmission rates, which are transmitted via the network NET and are needed for the signal processing by the base station (transcoding). The processor circuit SGC forms the central control unit of the base station BS and is also used to control signaling. It sees to it that the parameters determined by the evaluation circuit RCC are signaled to the mobile station.

Figure 4:
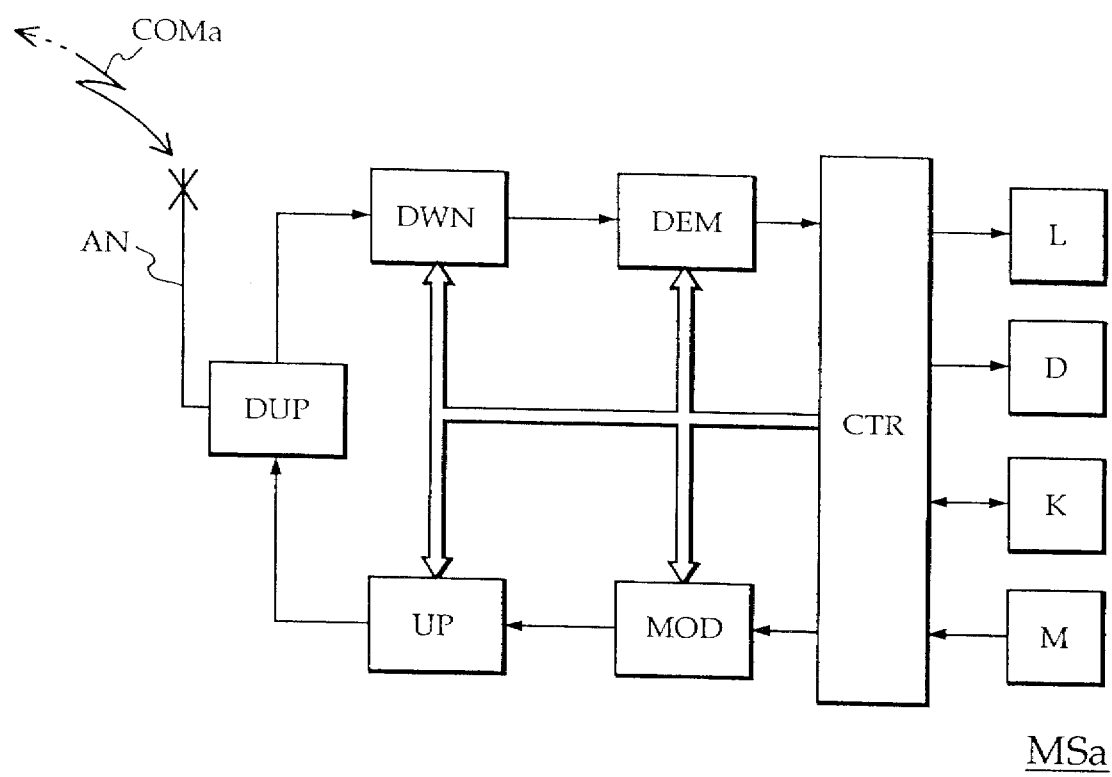
FIG. 4 depicts a radio station configured as a remote station for the mobile radio system.

FIG. 4 depicts a mobile station MSa according to the invention, which contains an antenna AN and a duplexer DUP connected thereto. The mobile station further contains receiving and transmitting means that precede or follow the duplexer. The receiving means contain a downwards mixer DWN and a demodulation stage DEM, the transmitting means contain a modulation stage MOD and an upwards mixer UP. The receiving and transmitting means are controlled by control circuit CTR. In addition to the receiving and transmitting means, this control circuit is also connected to output devices such as a loudspeaker L, a display screen D, a keyboard K and a microphone M, for example. The receiving and transmitting means of the mobile station depicted in FIG. 4 can be adjusted to the parameters specified by the base station. The receiving and transmitting means for signaling are not illustrated. To request a radio service, the subscriber selects from a menu a certain radio service and an assigned quality by means of the display and the keyboard. The control circuit CTR then generates a signal to the base station, which contains the identification of the radio service and the desired transmission capacity for example, which are needed to carry out the selected radio service with this quality. If the desired transmission capacity (channel capacity) is available, the base station signals the respective parameters required for adjusting the receiving and transmitting means of the mobile station. Through control circuit CTR, the mobile station adjusts its transmitting and receiving means to the parameters predetermined by the radio interface COMa.

If the transmission capacity desired by the subscriber is not available, the base station signals this fact to the remote radio station (mobile station). However, if the desired radio service can be performed with a smaller transmission capacity, where a minimum quality is specified, the base station signals an offer to the mobile station MSa, which is displayed on the screen. The subscriber can then accept the offer by using keyboard K. After the offer is accepted, the control circuit CTR adjusts the transmitting and receiving means to the parameters offered last.

During the performance of the radio services, the control circuit CTR continuously determines the transmission capacity needed for the input and output of the message signals. Changes in the transmission capacity need are signaled to the base station, which then adapts the parameters for adjusting the transmitting and receiving means in accordance with the changed transmission capacity. In addition to the high utilization of the frequency spectrum cited earlier, the lowest possible stress of the environment by radiated radio waves (electrosmog) is achieved. Also, in addition to the predeterminations and changes of the time, frequency and code channels described in detail herein, predeterminations and changes of the modulation (modulation depth), the source coding and the channel coding can take place. Furthermore, a transmission output adjustment can be envisioned, which adapts to the actual requirements of the mobile station (minimum required signal-to-noise-separation/bit error rate).

The mobile radio system illustrated here is a particularly advantageous configuration of the invention. Other radio systems can be envisioned, which contain stationary remote radio stations such as e.g. wireless, cross-linked computer systems or office communication systems. The use of the invention is particularly interesting in the area of radio transmission for multimedia applications, where considerable fluctuations of the required radio transmission capacity (message transfer rate) take place.

I claim:

1. Radio system (MRS) with at least one base station (BS) and remote radio stations (MSa, MSb, MSc) containing transmitting (MOD, UP) and receiving means (DWN, DEM) for the transmission of useful data via radio interfaces (COMa, COMb, COMc), whose respective transmission capacity is changed continuously by the base station on the basis of requests signaled by the remote radio stations (MSa, MSb, MSc), and based on a monitoring of existing radio transmissions in the field range (RC) of the base station (BS), wherein the base station (BS) determines variable parameters of the radio interfaces (COMa, COMb, COMc) for changing the respective transmission capacity, which variable parameters specify the modulation and the demodulation for the transmitting means (MOD, UP) or for the receiving means (DWN, DEM), respectively.

2. Radio system (MRS) with at least one base station (BS) and remote radio stations (MSa, MSb, MSc), which contain transmitting means (MOD, UP) and receiving means (DWN, DEM) for the transmission of useful data according to at least one multiple access method via radio interfaces (COMa, COMb, COMc), whose respective transmission capacity is changed continuously by the base station (BS) on the basis of requests signaled by the remote radio stations (MSa, MSb, MSc), and based on a monitoring of existing radio transmissions in the field range (RC) of the base station (BS), wherein the base station (BS) assigns radio channels with variable channel capacities for transmission to the remote radio stations (MSa, MSb, MSc) according to at least one multiple access method, by determining variable parameters of the radio interfaces (COMa, COMb, COMc), which variable parameters specify FDMA-frequency positions (Fa) and/or CDMA-codes (Cc1).

3. Radio system (MRS) according to claim 1, wherein for the radio transmission, the base station (BS) causes variable signal processing in the transmitting means (MOD, UP) and variable signal processing in the receiving means (DWN, DEM), by also determining those variable parameters of the radio interfaces (COMa, COMb, COMc), which variable parameters specify signal coding or signal decoding, respectively.

4. Radio system (MRS) according to claim 2, wherein for the radio transmission, the base station (BS) causes variable signal processing in the transmitting means (MOD, UP) and variable signal processing in the receiving means (DWN, DEM), by also determining those variable parameters of the radio interfaces (COMa, COMb, COMc), which variable parameters specify signal coding or signal decoding, respectively.

5. Radio system (MRS) according to claim 1, wherein the transmitting means (MOD, UP) and the receiving means (DWN, DEM) of at least the base station (BS) are adjustable for radio transmission according to different norms.

6. Radio system (MRS) according to claim 2, wherein the transmitting means (MOD, UP) and the receiving means (DWN, DEM) of at least the base station (BS) are adjustable for radio transmission according to different norms.

7. Radio system according to claim 1, wherein each remote radio station (MSa) includes a control circuit (CTR) that is connected to its transmitting means (MOD, UP), whereby it signals the request of a desired transmission capacity (CAPr) for transmitting useful data, and wherein the base station (BS) contains a monitoring circuit (ANA) connected to its receiving means (DWN) of the base station, whereby it determines the free transmission capacities (CAPl) for transmission within a specified frequency range.

8. Radio system according to claim 2, wherein each remote radio station (MSa) includes a control circuit (CTR) that is connected to its transmitting means (MOD, UP), whereby it signals the request of a desired transmission capacity (CAPr) for transmitting useful data, and wherein the base station (BS) contains a supervisory monitoring circuit (ANA) connected to its receiving means (DWN) of the base station, whereby it determines the free transmission capacities (CAPl) for transmission within a specified frequency range.

9. Radio system (MRS) according to claim 5, wherein the base station (BS) contains an evaluation circuit (RCC) connected to its transmitting and receiving means, whereby it predetermines and changes the variable parameters (Ta, Fa) of at least one of the radio interfaces (COMa) for each remote radio station (MSa) requesting the assignment of the desired transmission capacity (CAPr) in such a way, that the fewest and least possible of the free transmission capacities (CAPl) are occupied, and wherein the base station (BS) adjusts its transmitting and receiving means according to these variable parameters (Ta, Fa) through the evaluation circuit (RCC), and signals these variable parameters to the requesting remote radio station (MSa) for adjustment of its transmitting and receiving means.

10. Radio system (MRS) according to claim 7, wherein, to perform at least one service (TEL, FAX, VIDEO), the remote radio station (MSa) contains input/output devices (L, D, M, K) that are connected to the control circuit (CTR), with which a subscriber requests and utilizes this service (FAX), and that the control circuit (CTR) determines the desired transmission capacity (CAPr) on the basis of a minimum quality requested by the (FAX) service subscriber, or on the basis of a minimum transmission quality, which requires error-free signal processing in the input/output devices (L, D, M).

11. Radio system (MRS) according to claim 7, wherein the remote radio station (MSa) continuously requests the desired transmission capacity (CAPr), which the control circuit (CTR) determines on the basis of variations in the content of the useful data.

12. Base station (BS) containing transmitting means (MOD, UP) and receiving means (DWN, DEM) for the transmission of useful data between it and remote radio stations (MSa, MSb, MSc) via radio interfaces (COMa, COMb, COMc), whose respective transmission capacity are changed by the base station (BS) on the basis of requests emitted by the remote radio stations (MSa, MSb, MSc), and on the basis of the monitoring of existing radio transmissions in the field range (RC) of the base station (BS), wherein the base station (BS) determines variable parameters of the radio interfaces (COMa, COMb, COMc) for continuously changing the respective transmission capacity, which variable parameters indicate the modulation and the demodulation of the transmitting means (MOD, UP), or of the receiving means (DWN, DEM).

13. Base station (BS) containing transmitting means (MOD, UP) and receiving means (DWN, DEM) for the transmission of useful data between it and remote radio stations (MSa, MSb, MSc) according to at least one multiple access method via radio interfaces (COMa, COMb, COMc), whose respective transmission capacity is changed continuously by the base station (BS) on the basis of requests emitted by the remote radio stations (MSa, MSb, MSc), and on the basis of the monitoring of existing radio transmissions in the field range (RC) of the base station (BS), wherein the base station (BS) assigns radio channels with variable channel capacities for transmission to the remote radio stations (MSa, MSb, MSc), according to at least one multiple access method, by determining variable parameters of the radio interfaces (COMa, COMb, COMc), which variable parameters indicate FDMA-frequency positions (Fa) and/or CDMA-codes (Cc1).

14. Base station (BS) according to claim 12, wherein the base station predetermines and changes the variable parameters (T2, F2) on the basis of a request for a desired transmission capacity (CAPr) made by one of the remote radio stations (MS), wherein the base station contains a monitor circuit (ANA) connected to its receiving means (DWN), whereby it monitors existing radio transmissions inside a specified frequency range and determines free transmission capacities (CAPr), and wherein the base station contains an evaluation circuit (RCC) connected to its transmitting and receiving means, whereby it determines the variable parameters (Ta, Fa) of the radio interface (COMa), adjusts its transmitting and receiving means according to these parameters, and signals these parameters to the remote radio station (MSa) for their adjustment, so that the least and fewest possible free transmission capacities (CAPl) are occupied for the assignment of the desired transmission capacity (CAPr).

15. Base station (BS) according to claim 13, wherein the base station predetermines and changes the variable parameters (T2, F2) on the basis of a request for a desired transmission capacity (CAPr) made by one of the remote radio stations (MS), wherein the base station contains a monitor circuit (ANA) connected to its receiving means (DWN), whereby it monitors existing radio transmissions inside a specified frequency range and determines free transmission capacities (CAPr), and wherein the base station contains an evaluation circuit (RCC) connected to its transmitting and receiving means, whereby it determines the variable parameters (Ta, Fa) of the radio interface (COMa), adjusts its transmitting and receiving means according to these parameters, and signals these parameters to the remote radio station (MSa) for their adjustment, so that the least and fewest possible free transmission capacities (CAPl) are occupied for the assignment of the desired transmission capacity (CAPr).

16. Remote radio station (MSa) containing transmitting means (MOD, UP) and receiving means (DWN, DEM) for the transmission of useful data between it and a base station (BS) via a radio interface (COMa), whose transmission capacity is continuously changed by the base station (BS) on the basis of requests emitted by the remote radio station (MSa), and on the basis of the monitoring of existing radio transmissions in the field range (RC) of the base station (BS), wherein that the transmitting means (MOD, UP) and the receiving means (DWN, DEM) can be adjusted according to variable parameters (Ta, Fa) determined by the base station (BS), which variable parameters indicate the modulation and the demodulation of the transmitting means (MOD, UP) or of the receiving means (DWN, DEM), and wherein the remote radio station (MSa) contains an input/output device (L, D, M, K) whereby a subscriber requests and utilizes at least one service (FAX, VIDEO) for radio transmission, and wherein the remote radio station (MSa) contains a control circuit (CTR) that is connected to the input/output devices, the transmitting means (MOD, UP) and the receiving means (DWN, DEM), with which it determines a desired capacity (CAPr) for the radio transmission, and informs the base station (BS) of the request for this desired transmission capacity (CAPr).

17. Remote radio station (MSa) containing transmitting means (MOD, UP) and receiving means (DWN, DEM) for the transmission of useful data between it and a base station (BS) according to at least one multiple access method via a radio interface (COMa), whose transmission capacity is continuously changed by the base station (BS) on the basis of the monitoring of existing radio transmissions in the field range (RC) of the base station (BS), wherein the transmitting means (MOD, UP) and the receiving means (DWN, DEM) are adjustable according to variable parameters (Ta, Fa) determined by the base station (BS), and which variable parameters indicate an FDMA-position and/or a CDMA-code for a radio channel with a channel capacity that corresponds to the radio transmission, and wherein the remote radio station (MSa) contains an input/output device (L, D, M, K), whereby a subscriber requests and utilizes the transmission of at least one service (FAX, VIDEO), and wherein the remote radio station (MSa) contains a control circuit (CTR) that is connected to the input/output devices, the transmitting means (MOD, UP) and the receiving means (DWN, DEM), with which it determines a desired capacity (CAPr) for the radio transmission and signals the request for this desired transmission capacity (CAPr) to the base station (BS).

18. Remote radio station (MSa) according to claim 16, wherein the control circuit (CTR) determines the desired transmission capacity (CAPr) on the basis of a minimum quality requested by the service subscriber, or on the basis of a minimum transmission quality, which requires error-free signal processing in the input/output devices, and wherein the control circuit (CTR) adjusts the transmitting and receiving means according to the changed parameters (Ta, Fa) determined by the base station.

19. Remote radio station (MSa) according to claim 17, wherein the control circuit (CTR) determines the desired transmission capacity (CAPr) on the basis of a minimum quality requested by the service subscriber, or on the basis of a minimum transmission quality, which requires error-free signal processing in the input/output devices, and wherein the control circuit (CTR) adjusts the transmitting and receiving means according to the changed parameters (Ta, Fa) determined by the base station.

20. Radio interface (COMa, SIG1) for transmission in a radio system (MRS) between a base station (BS) and a remote radio station (MSa), comprising: a flexible radio interface (COMa) for transmitting useful data between the base station and the remote radio station, and a fixed radio interface (SIG1) for specifying variable parameters of the radio interface, wherein the variable parameters (Ta, Fa) specify modulation and demodulation of the transmission, thereby determining a continuously changing capacity of the radio transmission.

21. An FDMA- and/or CDMA-radio interface (COMc, SIG2) for transmission in a radio system (MRS) between a base station (BS) and one (MSc) of several radio stations, comprising: a flexible radio interface (COMc) for transmitting useful data between the base station and the remote radio station and a fixed radio interface (SIG2) for specifying variable parameters of the radio interface, wherein the radio interface (COMc) has variable parameters, which indicate an FDMA-frequency position and/or a CDMA-code (Cc1), thereby determining a continuously changing capacity of the transmission.

22. Method for transmission in a radio system (MRS) between a base station (BS) and a remote radio station (MSa), comprising the steps of:

signalling requests by the remote radio station for a transmission capacity;

transmitting via a radio interface (COMa, SIG1) with variable parameters (Ta, Fa), which indicate a modulation and demodulation for the transmission and a transmission capacity of the interface;

varying the transmission capacity according to the variable parameters; and changing the variable parameters in and by the base station (BS) on the basis of the requests signaled by the remote radio station (MSa), and on the basis of a monitoring of available capacity by the base station (BS) in a field range (RC) of the base station (BS).

23. Method for transmission according to at least one multiple access method in a radio system (MRS) between a base station (BS) and a remote radio station (MSa) of several remote radio stations, comprising the steps of:

transmitting through a radio interface (COMa, SIG1) with variable parameters (Ta, Fa), which indicate an FDMA-frequency position and/or a CDMA-code;

varying a transmission capacity of the transmission according to the variable parameters;

changing the variable parameters in and by the base station (BS) on the basis of requests signaled by the remote radio station (MSa), and on the basis of a monitoring of available capacity by the base station (BS) in a field range (RC) of the base station (BS).

24. Method according to claim 22, wherein said step of monitoring is of a specified frequency range, and wherein said step of changing the variable parameters (Ta, Fa) for the assignment of a requested transmission capacity (CAPr) is such that a fewest possible free transmission capacities (CAPl) are occupied.

25. Method according to claim 23, wherein said step of monitoring is of a specified frequency range, and wherein said step of changing the variable parameters (Ta, Fa) for the assignment of a requested transmission capacity (CAPr) is such that a fewest possible free transmission capacities (CAPl) are occupied.

26. Method according to claim 24, wherein if said monitoring determines the requested transmission capacity (CAPr) is greater than a free transmission capacity (CAPl), said method further comprising the steps of the base station (BS) and the remote radio station (MSa) agreeing not to transmit, or to transmit with minimum quality, and the base station (BS) determining the variable parameters (Ta, Fa) to guarantee this minimum quality.

27. Method according to claim 25, wherein if said monitoring determines the requested transmission capacity (CAPr) is greater than a free transmission capacity (CAPl), said method further comprising the steps of agreeing between the base station (BS) and the remote radio station (MSa) not to transmit, or to transmit with minimum quality, and the base station (BS) determining the variable parameters (Ta, Fa) to guarantee this minimum quality.

* * * * *